Feb. 1, 1944.  J. J. GROBE  2,340,378
CASSETTE
Filed March 14, 1942  2 Sheets-Sheet 1
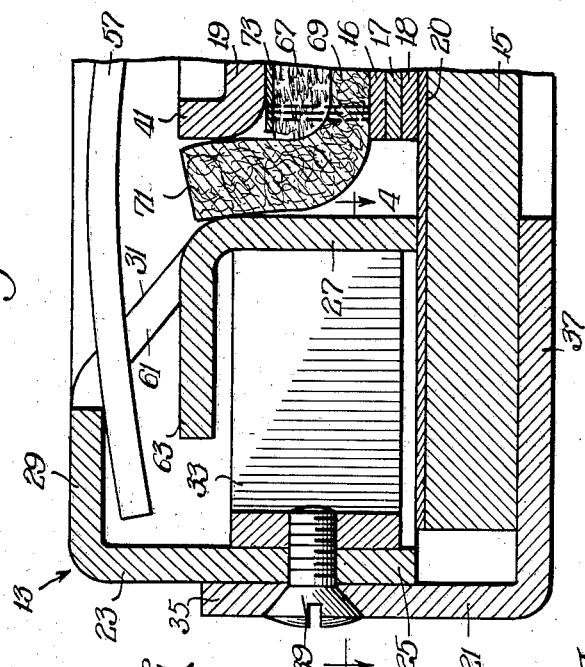
INVENTOR.
Julius J. Grobe,
BY
Spencer, Marzall, Johnston & Cook.

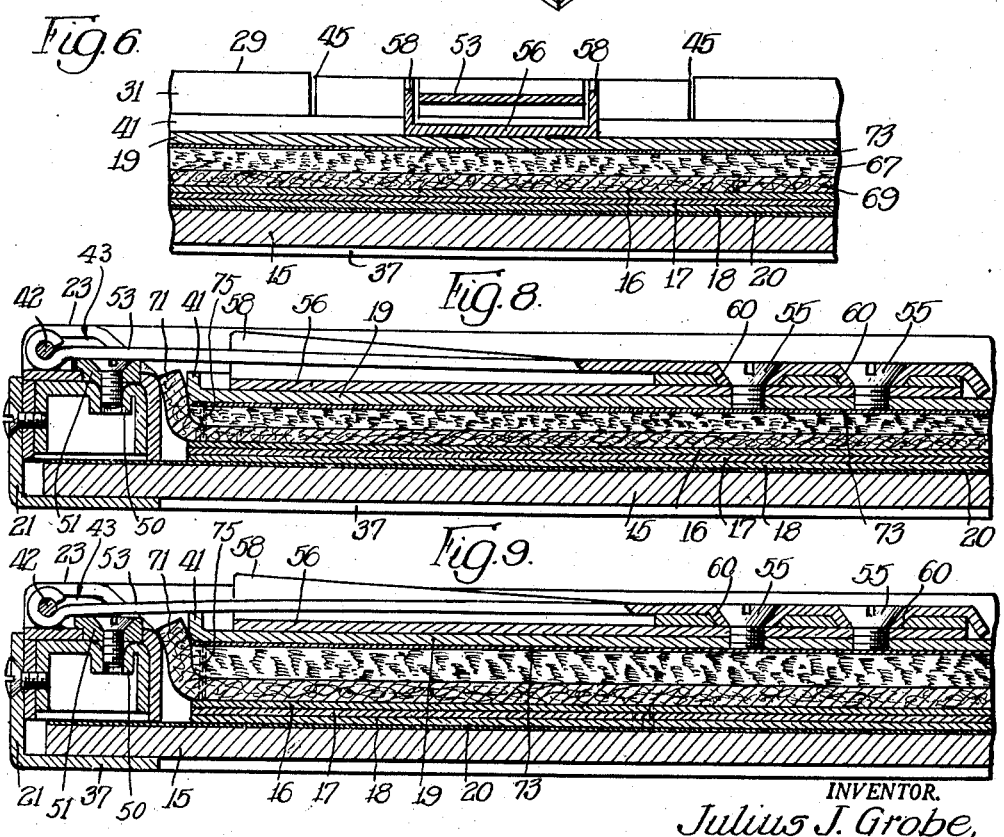

Patented Feb. 1, 1944

2,340,378

UNITED STATES PATENT OFFICE 2,340,378

CASSETTE

Julius J. Grobe, Oak Park, Ill., assignor to General Electric X-Ray Corporation, Chicago, Ill., a corporation of New York Application March 14, 1942, Serial No. 434,722

3 Claims. (Cl. 250—68)

My invention relates in general to holder frames and has more particular reference to cassettes for holding sensitive sheets in position for exposure, the invention particularly pertaining to an improved cassette structure for X-ray sensitive material such as is used in the making of radiographic pictures.

An important object of the invention is to provide a holder frame or cassette of unusually rigid, yet light weight construction; a further object being to utilize a hollow, rigidified frame member in building the frame of the cassette; a still further object being to employ a channeled sheet metal frame member interiorly reinforced as a light weight rigid frame element.

Another important object is to provide a cassette frame having inwardly facing beveled or mitered edges whereby to facilitate the positioning of material to be supported in the frame, particularly when loading the frame in a dark room.

Another important object resides in forming an improved latch keeper in the frame, as by slotting the same, for the reception of a spring latch on a back cover to removably retain the cover in closed position in the frame; a further object being to form a latch slot in a hollow frame member by pressing a flap portion thereof inwardly to form a latch receiving and guiding ledge at an edge of the latch slot; a still further object being to form the latch slot in the beveled edge portion of the frame.

Another important object is to provide hinge mounting seats in a frame of the character mentioned by pressing a portion of the hollow frame member inwardly to form a flat hinge seat.

Another important object is to provide an improved hinge for securing a cover on the frame; a further object being to utilize a hinge having a resilient member carrying the cover and adapted to yield as the hinge supported end of the cover is latched in the frame whereby to avoid shifting a sheet of material positioned in the frame beneath the cover when the cover is latched shut.

Another important object is to provide a hinge guard on the cover to obstruct the space between the resilient hinge portions and the cover and thereby prevent accidental entry therebetween of any object which might impair the action of the resilient hinge.

Another important object is to provide a sheet metal cover having a marginal rib or flange for stiffening the cover; a further object being to utilize extremely light gauge sheet metal as a cover.

These and numerous other important objects, advantages and inherent functions of the invention will become apparent as the invention is more fully understood from the following description, which, taken in connection with the accompanying drawings, discloses a preferred embodiment of the invention.

Referring to the drawings:

Figure 1 is a perspective view of a cassette embodying my present invention;

Figure 2 is a sectional view taken substantially along the line 2—2 in Figure 1;

Figure 3 is a sectional view taken substantially along the line 3—3 in Figure 2;

Figure 4 is a sectional view taken substantially along the line 4—4 in Figure 3;

Figure 5 is a sectional view illustrating a preferred mode of forming a hinge mounting in the frame;

Figure 6 is a sectional view taken substantially along the line 6—6 in Figure 2;

Figure 7 is a perspective view of a hinge card forming a part of the assembly as shown in Figures 1 and 2; and Figures 8 and 9 are enlarged sectional views illustrating the operation of the yieldable hinge forming a part of the structure shown in Figures 1 and 2.

To illustrate my invention, I have shown on the drawings a cassette or holder 11 comprising a rectangular frame 13 carrying a pane element 15 for and adapted to receive sensitive material in the form of a sheet 17 either alone or together with sheets 16 and 18, such as screens of the sort commonly used in conjunction with sensitive material in the making of X-ray pictures or radiographs on the layer 17 of sensitive material.

The cassette 11, in addition to the frame 13 and pane 15, comprises a cover 19 for enclosing the back of the frame in order to hold the sheet of material 17 and the screens 16 and 18, if the same be used, in flat condition between the pane 15 and the cover 19, it being particularly desirable, especially in making X-ray pictures, to support the sheet of material 17 as closely as possible in absolutely flat condition in the cassette. The screens 16 and 18, if used, may be disposed on opposite sides of the sheet 17, and the screen 18 may be attached to a layer 20 of cardboard as by cementing, the cardboard layer 20, in turn, being secured to the inner face of the window plate 15.

The frame 13 in my improved cassette structure comprises a pair of co-operating frame members 21 and 23, both preferably of rectangular configuration, although if it should be desired to make a circular frame or a frame of other than rectangular configuration, the frame members may be formed accordingly to other than rectangular shape. The frame member 23 preferably comprises a channel member formed of sheet metal, having an outer wall 25, an inner wall 27, and a top wall 29 having an inclined portion 31 facing inwardly of the frame member 23 and connecting with the inner wall 27. The channeled frame member 23 is preferably braced and rigidified by means of a bracing strip 33 having a zig-zag or serpentine configuration, which is secured in any suitable or preferred fashion, as by spot welding, to the spaced walls 25 and 27 of the channel member 23. The lower or open end of the channel member 23 forms a seat for receiving the marginal edges of the pane element 15 which comprises a plate of any suitable window material. Where the frame or cassette is used for X-ray purposes, the pane 15 preferably comprises a synthetic resin, such as Bakelite or other suitable material which is pervious to X-rays.

The frame member 21 preferably comprises a flanged rim having a portion 35 adapted to overlie and snugly embrace the wall 25 of the channeled frame member 23, the rim 21 having a portion 37 adapted to overlie the marginal edges of the pane 15 in order to hold it in seated position upon the open side of the frame member 23. Suitable fastening means is provided for securing the members 21 and 23 together, and while any suitable means may be employed for fastening the frame members 21 and 23 together upon the edges of the pane 15, I prefer to employ removable screws 39 placed at intervals in the frame in order that the rim 21 and the channeled frame member 23 may be easily separated in order to replace the pane 15 should the same become damaged.

The cover 19 preferably comprises a flat plate of sheet metal having an upstanding peripheral flange 41 of a size and shape to fit within the space defined by the walls 27 of the frame member 23, with a small clearance between said walls 27 and the marginal flanged edges 41 of the cover. The cover is preferably secured to the frame member 23 by hinges 43, the frame member 23 being formed with hinge mounting seats 45 in spaced relationship therein. These seats 45 are preferably formed in the member 23 by slitting the frame portions 29 and 31 and the upper portion of the wall 25 in order to form a notch and a flap 47 in the member 23, the flap 47 being integrally joined with the top of the wall portion 27 of the frame. The free edge portion of the flap 47 is removed along a line of cut 49 and the remaining flap portions pressed down on the notch and secured in place by welding. The bracing strip 33 is preferably omitted beneath the flap 47, and a channel brace 46, having marginal flanges 48, is secured as by welding in the member 23 beneath the flap 47. The brace 46 may be formed with a boss 50 to receive the hinge fastening screws 52. The foregoing arrangement provides an extremely rigid hinge mount in the frame member 23.

The hinges 43 comprise relatively pivoted portions 51 and 53, the portion 51 comprising a plate formed for reception in the hinge mounting 45, said plate being secured on the mounting 45 by fastening screws or any other suitable fastening expedient. The hinge portion 53 preferably comprises a tongue of sheet metal material tempered to afford substantial resilience therein. This tongue is hinged at one end on the co-operating hinge element, as by means of a pivot pin 42, and extends at its other end behind the cover 19, the extremity of the tongue being secured to the back of the cover preferably by means of removable screws 55 in order that the cover may be readily removed and replaced without requiring the removal of the hinge from its mounting 45. The tongue 53 has appreciable length between its pivoted end and its cover engaging extremity and, being resilient, affords flexible support for the hinge adjacent edge of the cover 19.

In order to guard against the possibility that extraneous objects may enter between the cover 19 and the flexible portions of the tongue 53 of each hinge and thus impair the operation of the spring hinge, I provide guard means 56, comprising upstanding flanges 58, on the cover 19 in position extending along the opposite side edges of the tongue 53 of each hinge between the flanged edge of the cover 19 and the cover attached extremity of the tongue. These guard flanges 58 are formed integrally along the opposite edges of a sheet metal plate which forms the guard means 56 and which is secured, as by spot welding, to the back of the cover 19 immediately beneath the overlying flexible portions of the hinge tongue 53 which it guards, the plate 56 being provided with openings 60 for the screws 55. The hinges also are arranged to allow hinged movement of the cover with respect to the frame 13 through an angular displacement substantially in excess of 180° from closed cover position. By virtue of the structure of the hinges, the cover may extend substantially in the plane of the frame when in open position on a flat support without applying any strain whatever upon the hinges, thereby minimizing the danger of hinge damage. As the cover is closed, with a sheet of sensitive material in place in the frame, the swinging edge of the cover first presses upon the hinge remote edge of the sensitive material which is thus held in place by the weight of the closed cover. The edge of the cover adjacent the hinges, however, is held yieldingly out of contact with the sensitive material by virtue of the resilience of the spring tongues 53 of the hinges until such cover portions are pressed downwardly into place upon the sensitive material in finally latching the cover in the frame. The cover thus closes down upon and clamps the light sensitive material in the frame from the hinge remote portions of the material toward the hinge adjacent edge thereof, thereby minimizing the possibility of crumpling or otherwise disturbing the sensitive sheet.

In order to latch the cover in closed position, it is provided with latch means preferably comprising a pair of spring clips 57. These clips 57 each comprise a strip of resilient sheet metal which is pivoted substantially at its mid point upon the back of the cover medially thereof in any suitable or preferred fashion, as by means of the rivet 59. The opposed ends of the latch strips 57 extend to the portions of the member 23 forming the opposite sides of the frame, said member 23 being formed with slots 61 to receive the ends of the latching strips 57.

The slots 61 are formed in the beveled walls 31 of the frame member 23 by slitting the member 23 to form a tongue 62, which is joined along its edge with the upper edge of the wall portion 27, said tongue being pressed inwardly and downwardly into position overlying the upper edge of the bracing strip 33. Each slot is positioned in the frame so as to receive the co-operating end of a member 57 when the same is turned in one direction, said slots each having an end adapted to receive and form the stop for the said member 57 when the same is in latched position with its ends underlying the overhanging top wall portion 29 of the frame 23 at the latching slot. The back of the cover 19 is also provided with stop pegs 65 set therein adjacent the rivets 55, there being a peg disposed on opposite sides of each latch strip 57 in order to limit the latching and unlatching movement of each strip so that both strips, when unlatched, will be retained in position to enter the latching slots 61 after a minimum movement thereof in relatching the same.

In order to obtain substantially uniform resilient pressure upon the back of the sensitive sheet whereby to press the same and the screen 18, if used, uniformly upon the back of the pane element 15, I prefer to mount resilient cushion means upon the pressing face of the cover 19, and I prefer to form the cushion means in a particular way in order to obtain substantially uniform resilient pressure throughout the pressing area of the cover 19 and to accommodate any and all slight variations in the pressing surface thereof. To this end, the cushion means comprises a relatively thin layer 67 of lamb's wool comprising wool obtained from the initial clipping of lambs. Such wool, being tightly curled, when spread out to form a thin layer, provides a multitude of tiny helically coiled hair springs affording substantially uniform resilient tension throughout the area in which the first clip lamb's wool is spread. In order to retain the layer of lamb's wool 67 upon the pressing surface of the cover 19, the same is distributed as uniformly as possible upon a thin layer of soft, flexible felt 69. This layer preferably has dimensions slightly larger than the cover 19, thereby affording marginal edges 71 extending outwardly of the edges of the cover 19 when the cushioning means is mounted thereon.

The layer of lamb's wool 67 is held upon the supporting felt sheet 69 by a second sheet 73 which conveniently may comprise the same soft felt material comprising the sheet 69. The felt backing sheet 73 preferably is of area substantially equal to the pressing surface of the cover 19, and it is secured at its edges, by means of suitable stitching 75, to the sheet 69 inwardly of the edges thereof. The cushioning means, comprising the layer of lamb's wool 67 and the retaining felt sheets 69 and 73, is applied to the pressing surface of the cover 19 and secured thereon, as by means of shellac adhering the sheet 73 to the pressing surface of the cover 19 in such position that the stitching 75 extends at and along the line of junction between the marginal flanges 41 and the flat plate-like portions of the cover 19.

As the cover 19 is closed in the frame 13, it will be noted that the lines of stitching 75 will enter the frame cavity at the edges while the marginal edges 71 of the sheet 69 will extend in the slight clearance space between the cover flanges 41 and the wall portion 27 of the frame member 23 and be gripped therebetween, thus slightly tensioning the sheet 69 and serving thus to present the cushioning means as flatly as possible to the sensitive material. The foregoing arrangement of the marginal edges 71 of the cushioning means forms a light-tight seal between the edges of the cover and the surrounding frame member 23, and the arrangement of the cover flange 41 in the manner illustrated and described provides for gently gripping the marginal edges 71 of the cover means without danger of cutting, fraying or chafing the cushioning means, thereby avoiding the production of lint which, when produced by fraying, may fall upon the sensitive material and impair the picture developed therein.

Cassettes made in accordance with my present invention have unusual rigidity as a result of the reinforced hollow frame structure embodying the bracing strip 33. The frame member 23, although of hollow, light weight, rigid structure, may be easily plated with chromium, nickel and the like in order to improve appearance and prevent tarnishing and deterioration, as by electroplating in a suitable liquid bath, the plating operation being facilitated by the open construction which allows the member 23 to be readily drained after immersion in the bath. This open construction of the frame member 23 also facilitates drainage of the member after immersion in varnish or other treating liquid. The open construction of the member 23 furthehr provides a rigid frame which is extremely light in weight.

The particular serpentine or zig-zag configuration of the bracing member 33 has the advantage that it may be readily secured in the channel member 23 by spot welding, which enables the frame to be made at minimum cost. The fact that the frame 13 comprises readily separable members 21 and 23 enables the pane element 15 to be easily replaced in the event of damage without requiring the removal of the hinge cover from the member 23 and, likewise, the cover may be easily removed and replaced on the hinges without disturbing any other part of the structure. The beveled construction 31 not only causes the sensitive material to slide naturally into place but also enables the provision of the cover latching slots 61 in the frame at minimum expense by a simple sheet metal stamping operation. The flexible tongue hinges 53 not only are inexpensive but aid in securing the sensitive sheet material in the frame without crumpling or otherwise displacing the same and further co-operate in supporting the cover for full 180° opening movement.

The invention is hereby claimed as follows:

1. A cassette for sensitive sheet material comprising a frame, a plate forming a closure for said frame, and a cover for holding the sensitive sheet in the frame and against the plate, said frame comprising a hollow channel member having a pair of spaced walls and a connecting wall integrally joining the spaced walls and forming a closed side of the channel member, said member having an open side opposite said closed side and forming a seat for the edge of the plate, and means on said channel member for securing the plate on said seat, and bracing means extending between and secured to said spaced walls, said bracing means comprising a corrugated metal strip having oppositely extending spaced convolutions integrally united respectively on said spaced walls.

2. A cassette for sensitive sheet material comprising a frame, a plate forming a closure for said frame, and a cover for holding the sensitive sheet in the frame and against the plate, said frame comprising a hollow channel member having a pair of spaced walls and a connecting wall integrally joining the spaced walls and forming a closed side of the channel member, said member having an open side opposite said closed side and forming a seat for the edge of said plate, and means on said channel member for securing the plate on said seat, and bracing means extending between and secured to said spaced walls, and hinge means for mounting said cover on said frame, comprising a flexible tongue secured on said cover and a pivot for mounting said tongue on said frame to allow movement of the cover in a lateral direction with respect to the axis of the pivot.

3. A cassette for sensitive sheet material comprising a frame, a plate forming a closure for said frame, and a cover for holding the sensitive sheet in the frame and against the plate, said frame comprising a hollow channel member having a pair of spaced walls and a connecting wall integrally joining the spaced walls and forming a closed side of the channel member, said member having an open side opposite said closed side and forming a seat for the edge of said plate, and means on said channel member for securing the plate on said seat, and bracing means extending between and secured to said spaced walls, and hinge means for mounting said cover on said frame comprising a flexible tongue secured at one end on the back of said cover inwardly of the hinge adjacent edge thereof, and a pivot tiltingly mounting the opposite end of said tongue on said frame, the parts being so arranged and conformed as to allow hinged movement of the cover with respect to the frame through an angular displacement substantially in excess of 180° from closed cover position and said tongue having appreciable resilience intermediate the pivot and cover connected ends thereof whereby to permit movement of the hinge adjacent edge of said cover in a lateral direction with respect to the axis of said pivot.

JULIUS J. GROBE.